United States Patent Office 3,154,020
Patented Oct. 27, 1964

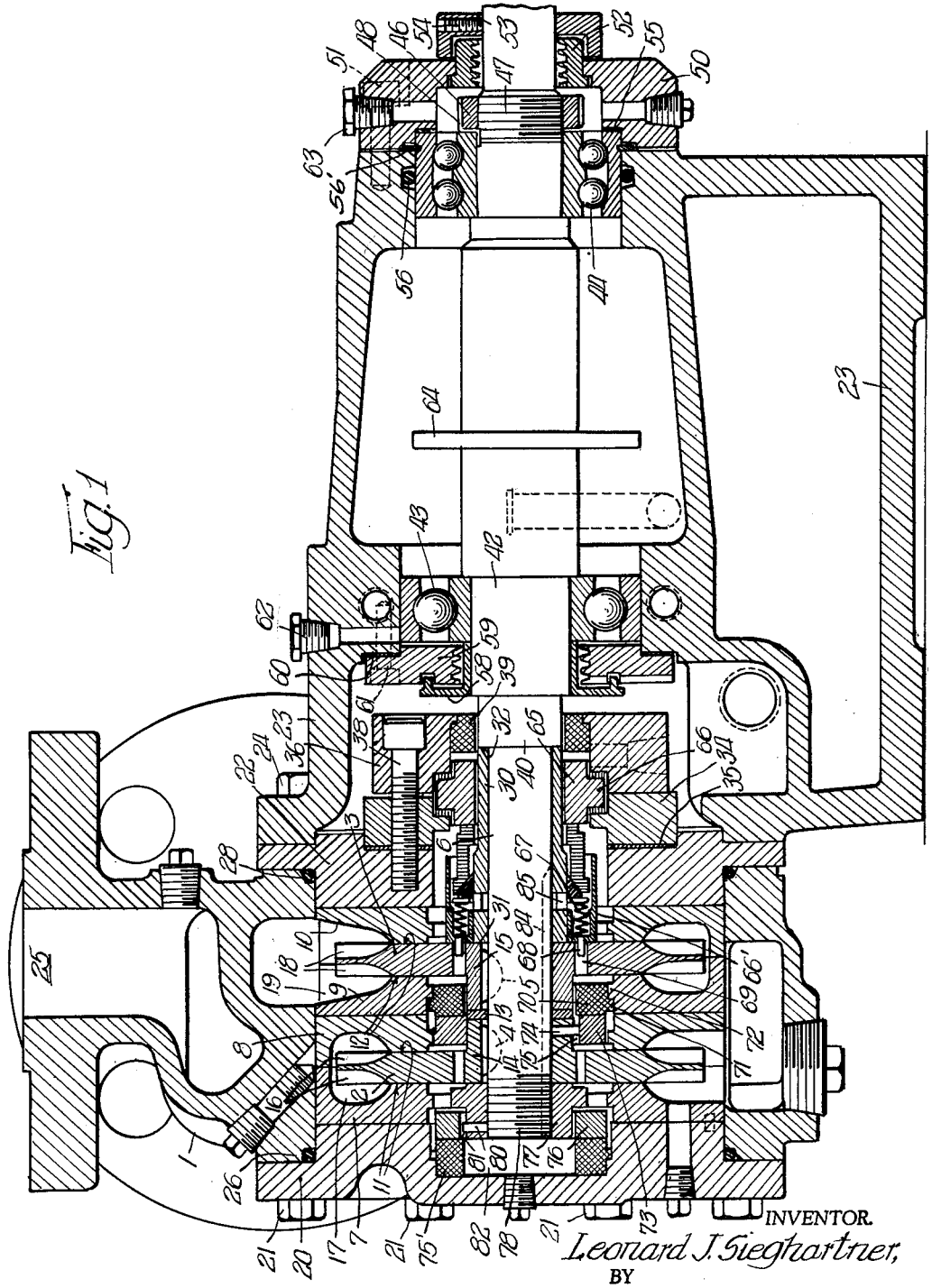

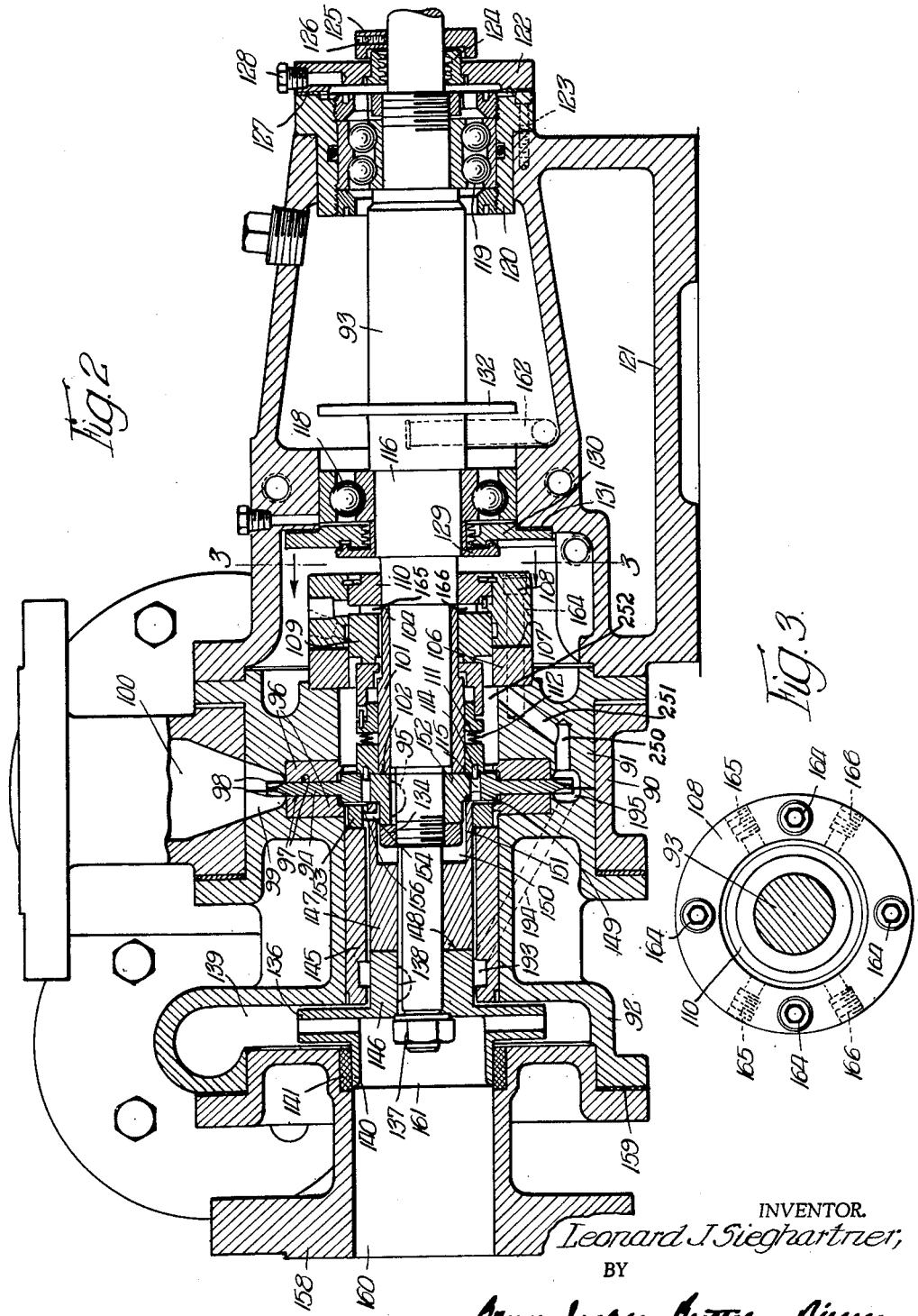

3,154,020
SEALING MEANS FOR ROTARY PUMP SHAFTS
AND THE LIKE
Leonard J. Sieghartner, Coal Valley, Ill., assignor to Roy E. Roth Company, Rock Island, Ill., a corporation of Illinois
Filed Apr. 5, 1962, Ser. No. 185,391
8 Claims. (Cl. 103—108)

This invention relates to sealing means for rotary pump shafts, and the like.

Heretofore, it has been the practice to employ packing or gaskets for sealing the shafts of pumps, and the like. Packing, gaskets and the like prevent handling of liquids which are not compatible with the packing or gasket material, or present a problem in this regard.

Other arrangements have contemplated not only gasketed sealing means, but also an additional pump for providing a pressure higher than the pressure in the impeller chamber of the pump.

The broad concept of the present invention resides in the provision of an improved sealing means having no packing or gaskets along the pump shaft. The advantage of no packing or gaskets is that liquids which are not compatible with elastic packing or gasket material may be handled.

Another feature of the invention resides in the provision of a face type seal with or without springs, and more particularly in the provision of an improved seal comprising a closely fitting ring which rotates with the shaft, and a stationary seal bushing which cooperate to form a close restriction to flow along the shaft without the use of gasketing material, packing, or the like.

Another feature resides in the provision of an improved form of seal in which the clearance between the shaft, impeller hub, or the like, and the ring which rotates with the shaft may be much less than is practical with a stationary bushing alone, and wherein the interface between the rotating ring and the stationary bushing allows for radial deflection or displacement of the shaft without the shaft coming in contact with the stationary bushing.

Another feature resides in the use of the inter seal of the present invention to reduce the end thrust on the shaft.

Another feature resides in the provision of an arrangement enabling shortening the distance between the stages of a multi-stage pump while still maintaining adequate sealing between stages; also an arrangement which will enable the imposition of greater loads on the structure, and with which bending moments on the shaft are reduced.

Another feature resides in the provision of an improved seal comprising a close fitting ring which rotates with the shaft and a stationary seal bushing, and in which the ring is forced against the bushing by pressure from an adjacent stage of the pump.

Further features and numerous advantages and adaptations of the invention will be apparent from the following detailed description taken in connection with the accompanying drawings, it being understood that the invention is limited only within the scope of the appended claims and not to the particular embodiments selected for illustration.

In the drawings:

FIGURE 1 is a longitudinal sectional view illustrating the application of sealing means embodying the present invention to a two stage turbine pump;

FIGURE 2 is a longitudinal sectional view illustrating the application of sealing means embodying the present invention to a centrifugal-turbine pump;

FIGURE 3 is a view partially in section and partially in elevation taken along the line 3—3 of FIGURE 2.

Figure 4:
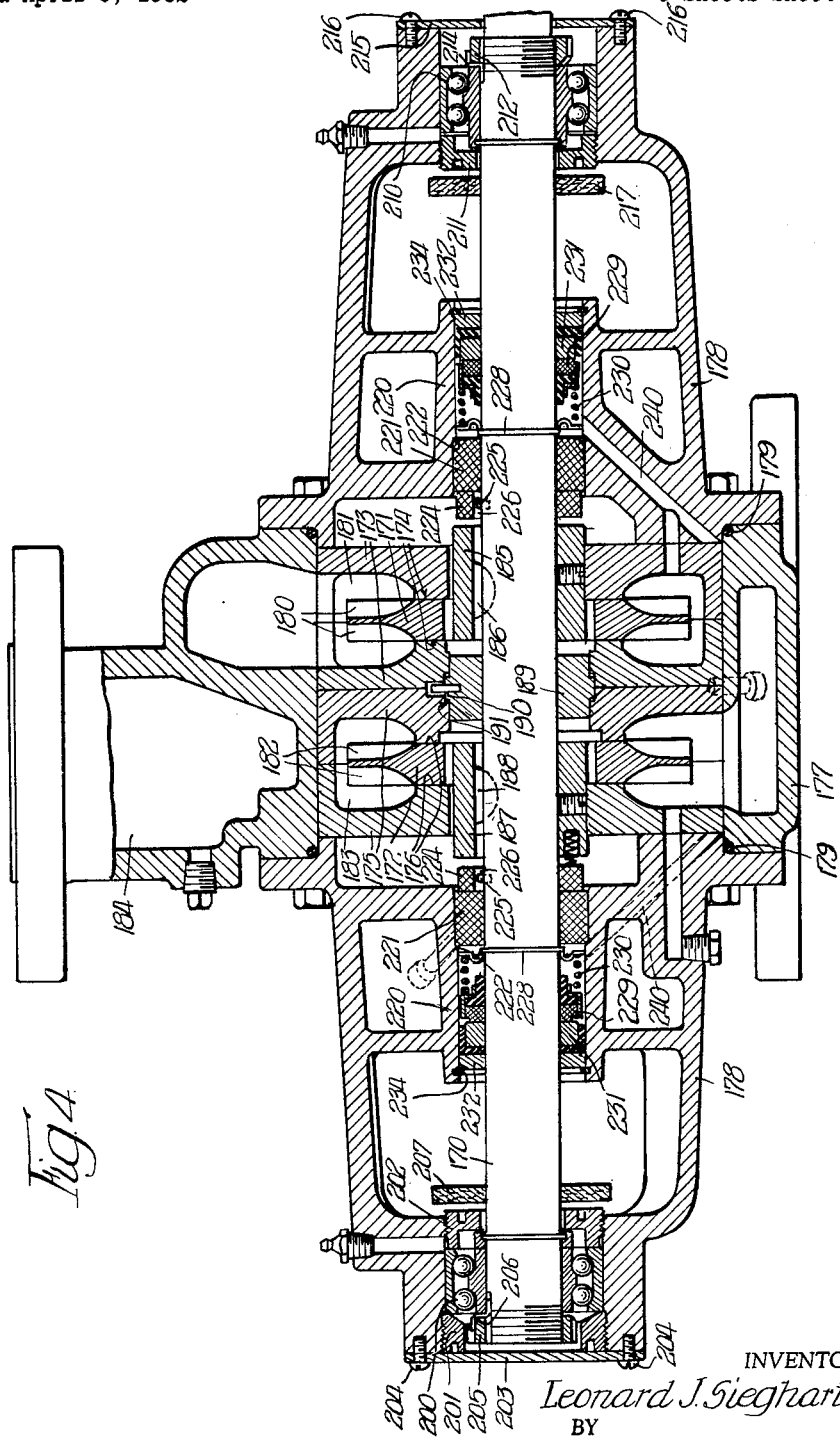
FIGURE 4 is a longitudinal sectional view illustrating another application of sealing means embodying the present invention to a two stage turbine pump.

Referring to the drawings for a detailed description, the pump selected for illustration in FIGURE 1 is a two stage turbine pump having a casing designated in its entirety by the numeral 1.

Turbine impellers 2 and 3 are fixed, for example, by Woodruff keys or splines 4 and 5 to rotate with the shaft 6. The impeller 2 rotates between outer and inner liners 7 and 8 and the impeller 3 rotates between outer and inner liners 9 and 10. The liners 7 and 8 cooperate with the opposite sides of the impeller 2 to form sealing surfaces 11 and the liners 9 and 10 cooperate with opposite sides of the impeller 3 to form sealing surfaces 12.

An annular impeller spacer 13 is disposed between the hubs 14 and 15 of the impellers 2 and 3. The impeller 2 has vanes or blades 16 opening from the opposite sides and peripherally from the impeller 2 and operable within a liquid channel 17. The impeller 3 has vanes or blades 18 opening from opposite sides and peripherally from the impeller 3 and operable within a liquid channel 19.

The casing 1 has an outboard cover 20 secured to the casing 1 by cap screws 21. The casing 1 also has an inboard cover 22 interposed between the casing 1 and a frame 23. The frame 23 and inboard cover 22 are secured to the casing 1 by cap screws 24. The impeller 3 constitutes the first stage of the pump for receiving liquid from the inlet and delivering same to the impeller 2 which constitutes the second stage and from which second stage the liquid is discharged through the pump outlet 25. Gaskets are provided at 26 and 28 between the outboard cover 20 and casing 1 and between the inboard cover 21 and the casing 1 respectively.

A shaft sleeve 30 surrounds the shaft 6 and at 31 abuts the inboard end of the impeller 3. The opposite end of the sleeve 30 abuts a shoulder 32 on the shaft 6. A stuffing box 34 is positioned with a gasket 35 between the inboard cover 22 and the stuffing box 34. A gland 36 secured to the inboard cover 22 by cap screws 38 has a bushing 39 surrounding the enlarged diameter portion 40 of the shaft 6 disposed within the gland 36.

A further enlarged diameter portion 42 of the shaft 6 is journaled for rotation in an inboard bearing 43. An outboard bearing 44 is provided between the shaft 6 and the frame 23 and shaft 6 is journaled for rotation in the bearing 44 outwardly of the bearing 43. A lock nut 46 is screwed upon the shaft 6 at 47 and a lock washer 48 is provided between the nut 46 and the inner race of the bearing 44.

An outer housing cap 50 is secured to the frame 23 by cap screws 51. A cap seal 52 is provided about the shaft 6 within the cap 50 and an outboard slinger 53 is secured to the shaft 6 by a screw 54. A gasket 55 is provided between the cap 50 and the outer race of the bearing 44. An O ring 56 is provided between the frame 23 and the outer race of the bearing 44 and is positioned in a groove in the frame 23.

Snap ring 56' is engaged in the outer periphery of the outer race of the bearing 44 and positioned between the cap 50 and the adjacent end of the frame 23. Adjustment for position of the impellers may be made by shims under the snap ring and also by shims between the impeller hubs 14 and 15.

An annular water slinger 58 is provided about the portion 42 of the shaft 6 and an inner housing cap is provided at 59. A gasket 60 is provided between the cap 59 and the frame 23. The cap 59 is secured to the frame 23 by cap screws 61. Vent fittings are provided at 62 and 63 and the shaft 6 has thereon an oil slinger 64 positioned within the frame 23 and between the bearings 43 and 44.

An annular member 65 surrounds the sleeve 30 and has an external annular flange 66 positioned between the stuffing box 34 and the gland 36. A seal rotating unit is provided at 66'. This unit has a spring 67 and pins 68 engaging in openings 69 in the impeller 3.

An annular carbon stationary bushing 70 surrounds the hub 15 of the impeller 3 and is disposed within the outer liner 9 for the impeller 3. The bushing 70 has an external annular flange 71 which abuts endwise in an inboard direction against an internal annular flange 72 on the liner 9.

An annular ring 73 fits closely about the hub 14 of the impeller 2. The hub 14 carries a generally radial pin 74 which at its outer end engages in a longitudinal groove 75 in the inner periphery of the annular sealing ring 73. The ring 73 thus rotates with the shaft 6 and impeller 2.

In the operation of the pump, the pressure from the second stage provided by the impeller 2 on the outboard end of the rotating ring 73 reaches the sealing ring 73 along the sealing surface 11 and forces the ring 73 longitudinally against the adjacent end of the stationary bushing 70 and thus seals off high pressure from the second turbine stage constituted by the impeller 2 from the first turbine stage constituted by the impeller 3. The clearance along the surfaces 11 is about .002 to about .015 of an inch.

The close fitting ring 73 which rotates with the shaft 6 together with the stationary seal bushing 70 forms a close restriction to flow along the hub at 245 axially of the shaft. The clearance between the impeller hub 14 and the ring 73 may be much less than is practical with a stationary bushing alone. The interface between the rotating ring 73 and the carbon stationary bushing 70 allows for radial deflection or displacement of the shaft without the shaft coming in contact with the stationary bushing 70. The interface being perpendicular to the axis of the shaft and clearance being provided at 246 between bushing 70 and sleeve 15 and spacer 13 permits the shaft to move radially from its normal center of rotation without sleeve 15 touching bushing 70.

In this embodiment of the invention, an annular carbon stationary bushing 75' is positioned in the outboard cover 20 as shown in FIGURE 1. An annular ring 76 fits closely about the hub of an impeller nut 77 which is screwed at 78 upon the shaft 6. The nut 77 rotates with the shaft 6 and holds the hubs of the impellers 2 and 3 and the spacer 13 in proper relation and between the nut 77 and the outboard end of the sleeve 30.

The hub of the nut 77 carries a generally radial pin 80 which at its outer end engages in a longitudinal groove 81 in the inner periphery of the sealing ring 76. The ring 76 thus rotates with the shaft 6 and nut 77.

In the operation of the pump, the pressure from the second stage provided by the impeller 2 on the inboard end of the rotating ring 76 reaches the sealing ring 76 along the sealing surface 11 and forces the ring 76 longitudinally against the adjacent end of the bushing 75' and thus seals off high pressure from the space 82 at the end of the shaft 6. This reduces end thrust on the end of the shaft which otherwise could be relatively great, i.e., in some instances of the order of about 450 pounds per square inch. The amount of clearance along the surfaces 11 has been previously indicated.

As with the ring 73, the close fitting ring 76 together with the stationary seal bushing 75' forms a close restriction to flow into the space 82 at the end of the shaft. The clearance between the shaft or nut 77 and the ring 76 may be much less than is practical with a stationary bushing alone. The interface between the rotating ring 76 and the carbon stationary bushing 75' also allows for radial deflection or displacement of the shaft. The present invention provides a practical means to close off one chamber from the pressure in another adjacent chamber even though a rotating shaft must project through or into both chambers. This means allows the shaft to be offset from its normal axis of rotation (as it would under deflecting load) without coming into contact with the adjacent walls of the chamber and a practical seal is still maintained. A further development is to use this means to reduce end thrust on a shaft so projecting through one chamber and terminating in the adjacent chamber. These objectives are set forth in column 1 of the specification of the present application.

The shaft 6 also has an open longitudinal groove 84 which opens from the space 82 to a low pressure area provided by openings 85 through the sleeve 30. Thus, such pressure as may enter the space 82 is bled therefrom to the low pressure area 85, further to reduce end thrust on the shaft. The groove 84 extends from the chamber 82 sealed off at the end of the shaft to a lower pressure area around the main face type seal. The pressure which enters the space 82 could, of course, be piped off externally to a low pressure area. The arrangement described enables shortening the distance between the stages of the pump while still maintaining adequate sealing. Greater loads may be imposed on the structure and bending moments on the shaft are reduced.

The pump shown in FIGURES 2 and 3 is a centrifugal-turbine pump having a casing 90, an inboard head 91, a case head 92 and a shaft 93.

A turbine impeller 94 is fixed, for example, by a Woodruff key 95 or spline to rotate with the shaft 93. The impeller 94 rotates between wear rings 96 which cooperate with the opposite sides of the impeller 94 to form sealing surfaces 97. The impeller 94 has vanes or blades 98 opening from the opposite sides and peripherally from the impeller and operable in the channel 99 and the liquid is discharged through the pump outlet 100.

A shaft sleeve 101 surrounds the shaft 93 and at 102 abuts the inboard end of the impeller 94. The opposite end of the sleeve 101 abuts a shoulder 104 on the shaft 93. A stuffing box 106 is positioned with a gasket 107 between same and a gland 108. A carbon stationary seat is provided at 109 and a quench bushing is provided at 110. A seal rotating unit is provided at 111. This unit has a spring 112 and pins 114 engaging in openings 115 in the impeller 94.

A further enlarged diameter portion 116 of the shaft 93 is journaled for rotation in an inboard bearing 118. An outboard bearing 119 is provided between the shaft 93 and a bearing cartridge 120 in the adjacent end of the frame 121. An outer housing cap 122 is secured to the frame 121 by screws 123. A cap seal 124 is provided about the shaft 93 within the cap 122 and an outboard slinger 125 is secured to the shaft 93 by set screws 126. A gasket 127 is provided between the cap 122 and the bearing cartridge 120. A vent fitting is provided at 128.

A water slinger is provided at 129 and an inner housing cap is provided at 130. A gasket 131 is provided between the cap 130 and the adjacent portion of the frame 121. The shaft 93 carries an oil slinger 132 positioned within the frame 121 and between the bearings 118 and 119.

An impeller lock nut 134 is screwed upon the reduced diameter portion of the shaft 93. The nut 134 holds the hub of the impeller 94 between the nut 134 and the adjacent end of the sleeve 101. The centrifugal impeller 136 is secured on the centrifugal stage end of the shaft 93 by a nut 137 and is fixed, for example, by a Woodruff key 138 or spline to rotate with the shaft 93. The centrifugal impeller 136 rotates within the channel 139 and the hub 140 of the impeller 136 rotates in the bushing 141.

An annular carbon stationary bushing 145 is disposed within the case and surrounds the hub 146 of the impeller 136 and an impeller spacer 147. The impeller spacer 147 abuts at one end at 148 the inner end of the hub 146 and at its opposite end at 149 the impeller 94. The inner end of the spacer 147 is recessed at 150 to form an annular wall 151 which surrounds nut 134 and the hub 152 of the turbine impeller 94.

An annular throttle ring 153 fits closely about the spacer 151 in position between the impeller 94 and the adjacent end of the bushing 145. The spacer 147 rotates with the shaft 93 and the annular wall 151 carries a generally radial pin 154 which at its outer end engages in longitudinal groove 156 in the inner periphery of the throttle or sealing ring 153. The ring 153 thus rotates with the shaft 93.

A head 158 is attached to the case head 92 with a gasket 159 therebetween. The head 158 has an inlet 160 which opens into the suction inlet 161 of the centrifugal impeller 136. An oil gauge may be provided at 162.

In the operation of the pump shown in FIGURES 2 and 3, the liquid enters the suction entrance 161 of the centrifugal impeller 136 and the liquid passes from the centrifugal stage to the turbine stage constituted by the turbine impeller 94 and is discharged through the outlet 100. In operation, the pressure or pressure leakage from the turbine stage along the sealing surface 97 acts on the adjacent end of the rotating ring 153 and forces this ring longitudinally against the adjacent end of the stationary bushing 145. The high pressure from the turbine stage is thus effectively sealed off from the centrifugal stage of the pump constituted by the impeller 136.

As before, the close fitting ring 153 which rotates with the shaft 93 together with the stationary seal bushing 145 forms a close restriction to flow along the shaft 93 without the use of gasketing material. The clearance between the member 147 and the ring 153 may be much less than is practical with a stationary bushing alone. Also, as before, the interface between the rotating ring 153 and the carbon stationary bushing 145 allows for radial deflection or displacement of the shaft without contact with the bushing 145.

The gland 108 is secured to the inboard head 91 with the stuffing box 106 therebetween, for example, by bolts 164. As shown in FIGURE 3, coolant or lubricating connections may be provided at 165 and quench connections may be provided at 166.

The inner surface of the bushing 145 has an annular groove 193 from which a passage shown in dotted lines at 194 opens from the groove 193 to the channel 195. A passage 250 opens from channel 195 to a passage 251 which opens into a chamber 252 about seal 111 thus bleeding any leakage to a low pressure area.

The pump shown in FIGURE 4 is a two stage turbine pump having a shaft 170, a first stage turbine impeller 171 and a second stage turbine impeller 172.

The impeller 171 rotates between liners 173 which cooperate with opposite sides of the impeller 171 to form sealing surfaces 174. The impeller 172 rotates between liners 175 which cooperate with opposite sides of the impeller 172 to form sealing surfaces 176. The case 177 is positioned between frames 178 with case gaskets at 179. The impeller 171 has vanes or blades 180 opening from the opposite sides and peripherally from the impeller which rotate in the channel 181. The impeller 172 has vanes or blades 182 opening from the opposite sides and peripherally from the impeller which rotate in the channel 183. The pump outlet is indicated at 184.

The hub 185 of impeller 171 is fixed, for example, by a Woodruff key or spline 186 to the shaft 170 so that the impeller 171 will rotate with the shaft. The hub 187 of impeller 172 is fixed, for example, by a Woodruff key or spline 188 to the shaft 170 so that the impeller 172 will rotate with the shaft 170. Between the impellers 171 and 172 is a liner bushing 189 surrounding the shaft 170 and having an external annular flange 190 positioned in annular grooves 191 in adjacent liners 173 and 175.

At its left hand end, as shown in FIGURE 4, the shaft 170 is journaled for rotation in a bearing 200. The outer race of the bearing 200 is positioned endwise between adjusting collars 201 and 202 screwed into the adjacent portion of the bearing bracket 178. A housing cap 203 is fastened to the adjacent bearing bracket 178 by set screws 204. A bearing lock nut 205 is screwed onto the adjacent end of the shaft 170 and a bearing lock washer is provided at 206. A water slinger is provided at 207.

Near its right hand end, as shown in FIGURE 4, the shaft 170 is journaled for rotation in a bearing 210. An adjusting collar 211 is screwed into the adjacent portion of the bearing bracket 178 and a bearing lock nut 212 is screwed upon the shaft 170. A bearing lock washer is provided at 214 and a housing cap 215 surrounds the shaft 170 and is fastened to the adjacent bearing bracket 178 by screws 216. A water slinger is shown at 217.

Each bearing bracket 178 has a tubular portion 220 and annular stationary bushings 221 are positioned withing the enlarged bores at the inner ends of the tubular portions 220 and held against outward displacement by abutting engagement with the annular shoulders 222. An annular throttle ring 224 is positioned between each bushing 221 and the adjacent ends of the hubs of the impellers 171 and 172. These rings 224 fit closely about the shaft 170.

The shaft 170 carries generally radial pins 225, one for each ring 224. These pins 225 engage at their outer ends in longitudinal grooves 226 in the inner peripheries of the throttle or sealing rings 224. The rings 224 thus rotate with the shaft 170.

In the operation of the pump shown in FIGURE 4, the liquid is delivered from the first turbine stage constituted by the turbine impeller 171 to the second turbine stage constituted by the turbine impeller 172 and is discharged through the pump outlet 184. The pressure or pressure leakage from the adjacent turbine stages along the sealing surfaces 174 and 176 acts on the inner ends of the rotating rings 224 and forces these rings 224 longitudinally or outwardly against the adjacent ends of the stationary bushings 221.

As before, the close fitting rings 224 which rotate with the shaft 170 together with the stationary seal bushings 221 form close restrictions to flow along the shaft in outward directions and without the use of gasketing material. The clearance between the shaft 170 and the rings 224 may be much less than is practical with a stationary bushing alone. Also, as before, the interfaces between the rotating rings 224 and the carbon stationary bushings 221 allow for radial deflection or displacement of the shaft.

Within the tubular portions 220 and outwardly of the bushings 221, the shaft 170 has snap rings 228 engaged therewith and seals 229 are pressed by springs 230 into sealing cooperation with seal seat gaskets 231. Glands are provided at 232 and further snap rings 234 are snapped into grooves in the interior surfaces of the tubular portions 220 near the outer ends thereof.

In FIGURE 4 bleed back passages 240 extend from positions outwardly of the bushings 221 to low pressure areas. The application of this and the foregoing features to a single stage pump are contemplated.

The embodiments of the invention disclosed in the drawings and the specification are for illustrative purposes only, and it is to be especially understood that said drawings and the specification are not to be construed as a definition of the limits or scope of the invention, reference being had to the appended claims for that purpose.

I claim:

1. A turbine pump comprising a casing having an internal pumping chamber, a pump shaft mounted for rotation within said casing, an impeller and rotatable part fixed for rotation with said shaft and operable within said pumping chamber, said impeller having vanes at its outer periphery operable within a channel, liners disposed within said casing and cooperating with opposite sides of said impeller inwardly of said vanes to form sealing surfaces therewith, a stationary annular seal bushing surrounding said shaft, and a ring closely fitting said rotatable part of the pump and fixed for rotation with said shaft including a pin rotatable with said shaft, said ring having a longitudinal groove engaging said pin for axial movement, said close fitting ring being disposed between said impeller and said annular seal bushing and movable longitudinally with respect to said shaft, said close fitting ring at the end toward said impeller being exposed to pressure from the impeller reaching the end of said close fitting ring along the sealing surface between the impeller and the liner whereby such pressure forces said close fitting ring longitudinally against said annular seal bushing to seal off pressure from said channel in which the vanes of the impeller operate.

2. A pump according to claim 1, wherein the close fitting ring fits closely and externally about a hub on the impeller and is connected to said hub for rotation with the impeller by disposition of the pin on the hub of the impeller for engagement in the longitudinal groove in said ring.

3. A pump according to claim 1, wherein the annular seal bushing is formed of material dissimilar to the close fitting ring and is separate from and pressed into the liner and held against longitudinal movement in the direction of longitudinal movement of said close fitting ring.

4. A pump according to claim 1, wherein there is a second impeller fixed for rotation with said shaft with liners disposed within said casing and cooperating with opposite sides of said second impeller, said annular seal bushing with which said close fitting rotating ring cooperates being disposed within a liner for said second impeller.

5. A pump according to claim 1, wherein the annular seal bushing with which the close fitting ring cooperates is fixed within an adjacent portion of the pump casing.

6. A pump according to claim 1, wherein there is an outboard cover for the pump casing with a space between the end of the pump shaft and said outboard cover, a second annular seal bushing positioned in said outboard cover, and a second close fitting ring fixed for rotation with the pump shaft and disposed between said impeller and said second seal bushing and movable longitudinally with respect to said shaft, said second close fitting ring at the end toward said impeller being exposed to pressure from the impeller reaching the end of said close fitting ring along the sealing surface between the impeller and the liner whereby said pressure forces said second close fitting ring longitudinally against said second seal bushing to seal off high pressure from the space at the end of the pump shaft.

7. A pump according to claim 1, wherein there is an outboard cover for the pump casing with a space between the end of the pump shaft and said outboard cover, a second annular seal bushing positioned in said outboard cover, and a second close fitting ring fixed for rotation with the pump shaft and disposed between said impeller and said seal bushing and movable longitudinally with respect to said shaft, said second close fitting ring at the end toward said impeller being exposed to pressure from the impeller reaching the end of said close fitting ring along the sealing surface between the impeller and the liner whereby said pressure forces said second close fitting ring longitudinally against said second seal bushing to seal off high pressure from the space at the end of the pump shaft, said pump shaft having a longitudinal groove opening at one end to the space between the end of the pump shaft and said outboard cover an opening at its opposite end to a low pressure area.

8. A pump according to claim 1, wherein there is a second impeller fixed for rotation with said shaft with liners disposed within the casing and cooperating with opposite sides of said second impeller inwardly of vanes at the outer periphery of said second impeller, a second stationary annular seal bushing surrounding said shaft, and a second ring closely fitting a rotatable part of the pump and fixed for rotation with said shaft by a pin rotatable with said shaft and engaging in a longitudinal groove in said second ring, said second close fitting ring being disposed between said second impeller and said second stationary annular seal bushing and movable longitudinally with respect to said shaft, said second close fitting ring at the end toward said second impeller being exposed to pressure from said second impeller reaching the end of said close fitting ring along the sealing surface between the second impeller and the liner whereby such pressure forces said second close fitting rotating ring longitudinally against said second annular seal bushing to seal off pressure from the channel in which the vanes at the periphery of said second impeller operate.

References Cited in the file of this patent

UNITED STATES PATENTS

| | | |
|---|---|---|
| 1,835,877 | Joyce | Dec. 8, 1931 |
| 2,007,414 | Weis et al. | July 9, 1935 |
| 2,087,313 | Bigelow et al. | July 20, 1937 |
| 2,258,416 | Leopold et al. | Oct. 7, 1941 |
| 2,296,640 | Hansen | Sept. 22, 1942 |
| 2,775,208 | Mueller | Dec. 25, 1956 |
| 2,809,854 | McGahan | Oct. 15, 1957 |
| 2,858,768 | Gaylord et al. | Nov. 4, 1958 |
| 2,905,093 | Raub et al. | Sept. 22, 1959 |
| 3,001,806 | Macks | Sept. 26, 1961 |
| 3,002,463 | Lahti | Oct. 3, 1961 |

FOREIGN PATENTS

| | | |
|---|---|---|
| 161,106 | Sweden | Oct. 29, 1957 |